United States Patent Office 2,960,523
Patented Nov. 15, 1960

2,960,523
DIALKYLPHOSPHATOALKYL VINYL SULFIDES

Joseph L. O'Brien, Elkins Park, Pa., assignor to Rohm & Haas Company, Philadelphia, Pa., a corporation of Delaware No Drawing. Filed Dec. 19, 1957, Ser. No. 703,744

6 Claims. (Cl. 260—461)

This invention relates to polymerizable phosphoric ester derivatives of hydroxyalkyl vinyl sulfides having the general formula:

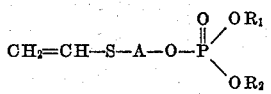

wherein A is a straight chain, branched or cyclic alkylene group having two to six carbon atoms, and $R_1$ and $R_2$ each represent an alkyl group having one to four carbon atoms. Such compounds are prepared by reacting, under controlled temperature conditions, e.g. 10° C.–30° C., a lower hydroxyalkyl vinyl sulfide with an appropriate derivative of phosphoric acid, such as a dialkyl chlorophosphate, in the presence of a tertiary amine, such as pyridine, triethylamine or benzyl dimethylamine, as hydrogen chloride acceptor.

Examples of compounds within the scope of this invention are those represented by the following structural formulas and names:

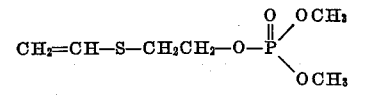
2-dimethylphosphatoethyl vinyl sulfide

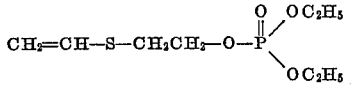
2-diethylphosphatoethyl vinyl sulfide

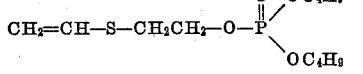
2-dibutylphosphatoethyl vinyl sulfide

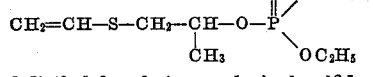
2-diethylphosphatopropyl vinyl sulfide

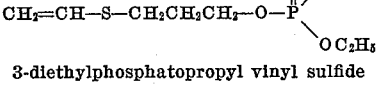
3-diethylphosphatopropyl vinyl sulfide

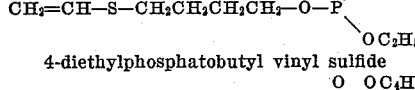
4-diethylphosphatobutyl vinyl sulfide

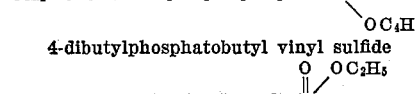
4-dibutylphosphatobutyl vinyl sulfide

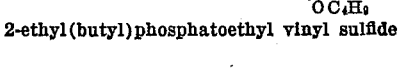
2-ethyl(butyl)phosphatoethyl vinyl sulfide

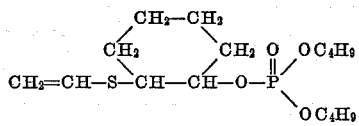
2-dibutylphosphatocyclohexyl vinyl sulfide

EXAMPLE 1

*Preparation of 2-diethylphosphatoethyl vinyl sulfide*

To 208 grams (2.0 moles) of 2-hydroxyethyl vinyl sulfide, 200 ml. of pyridine and 1200 ml. of anhydrous benzene there was added 345 grams (2.0 moles) of diethyl chlorophosphate over a period of one hour with rapid stirring. During the addition of the chlorophosphate the temperature of the reaction mixture was held at 20–25° C. by means of an ice-bath. The mixture was stirred for an additional two hours and then allowed to stand overnight at room temperature.

There was added to the chilled (5–10° C.) reaction mixture a solution of 50 ml. of concentrated hydrochloric acid and 450 ml. of water. The mixture was stirred for ten minutes and then allowed to settle into two liquid layers. The lower aqueous phase was separated and the benzene solution was washed successively with 500 ml. of 5% potassium carbonate solution and 500 ml. of 5% sodium chloride solution. After being dried over anhydrous magnesium sulfate and filtered, the benzene solution was stripped under reduced pressure in the presence of 0.8 gram of N,N'-di-2-(1,4-naphthoquinonyl)-p-phenylenediamine and 0.1 gram of hydroquinone. The residue was distilled at reduced pressure.

The product which collected at 115–117° C./0.2 mm. amounted to 412.4 grams (86% yield) and was identified as diethylphosphatoethyl vinyl sulfide, $n_D^{25}$ 1.4655.

EXAMPLE 2

*Preparation of 2-dibutylphosphatoethyl vinyl sulfide*

To 104 grams (1.0 mole) of 2-hydroxyethyl vinyl sulfide, 100 ml. of pyridine and 600 ml. of anhydrous benzene there was added 228.5 grams (1.0 mole) of dibutyl chlorophosphate over a period of one hour with rapid stirring. During the addition of the chlorophosphate the temperature of the reaction mixture was held at 20–25° C. by means of an ice-bath. The mixture was stirred for an additional two hours and then allowed to stand overnight at room temperature.

There was added to the reaction mixture a solution of 25 ml. of concentrated hydrochloric acid and 250 ml. of water. The mixture was agitated and then allowed to settle into two liquid layers. The lower aqueous phase was separated and the benzene solution was washed successively with 250 ml. of ice-cold 5% sodium hydroxide solution and 250 ml. of water. After being dried over anhydrous magnesium sulfate and filtered, the benzene solution was stripped under reduced pressure to give 275 grams (92% yield) of a clear yellow oil identified as 2-dibutylphosphatoethyl vinyl sulfide.

EXAMPLE 3

*Preparation of 2-diethylphosphatocyclohexyl vinyl sulfide*

To 15.8 grams (0.10 mole) of 2-hydroxycyclohexyl vinyl sulfide, 10 ml. of pyridine and 60 ml. of anhydrous benzene there was added 17.3 grams (0.10 mole) of diethyl chlorophosphate over a period of one hour with rapid stirring. During the addition of the chlorophosphate the temperature of the reaction mixture was held at 20–25° C. by means of an ice-bath. The mixture was stirred for an additional two hours and then allowed to stand overnight at room temperature.

There was added to the reaction mixture a solution of 3 ml. of concentrated hydrochloric acid and 25 ml. of water. The mixture was agitated and then allowed to settle into two liquid layers. The lower aqueous phase was separated and the benzene solution was washed successively with 25 ml. of ice-cold 5% sodium hydroxide solution and 25 ml. of water. After being dried over anhydrous magnesium sulfate and filtered, the benzene solution was stripped under reduced pressure to give 23.6 grams (80% yield) of a dark amber oil identified as 2-diethylphosphatocyclohexyl vinyl sulfide.

EXAMPLE 4

*Copolymerization of 2-diethylphosphatoethyl vinyl sulfide*

Six grams of 2-diethylphosphatoethyl vinyl sulfide, 12 grams of methyl methacrylate, 2 grams of methacrylic acid and 0.02 grams of 2,2'-azobis(isobutyronitrile) initiator were mixed well and placed in a small glass vial. after flushing the vial with nitrogen, it was sealed with a cotton plug and immersed in an oil bath held at 60° C. After 48 hours, the vial was removed and its contents found to consist of a clear, colorless plastic having a Barcol hardness value of 25. The terpolymer was found to be self-extinguishing on the first attempt to ignite it by means of a Bunsen flame (30 second ignition period) and it burned reluctantly with considerable carbonization on the second ignition with a Bunsen flame. This result indicates that 2-diethylphosphatoethyl vinyl sulfide copolymerizes well with methyl methacrylate under these conditions and contributes appreciable flame-resistance to its copolymers.

In a similar manner, other dialkylphosphatoalkyl vinyl sulfides are copolymerized with methyl methacrylate and other acrylic and methacrylic esters to give copolymers of interest as flame-proofing agents for textiles and paper products. Such copolymers are advantageously prepared in emulsion.

Usefulness of the invention

The dialkylphosphatoalkyl vinyl sulfides copolymerize with acrylic and methacrylic esters to give copolymers containing both sulfur and phosphorous which are of interest as oil additives. The sulfides per se have insecticidal properties.

I claim:

1. A compound having the general formula

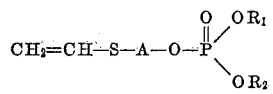

wherein A is a member of the class consisting of straight chain, branched and cyclic alkylene groups having two to six carbon atoms and $R_1$ and $R_2$ are each an alkyl group having one to four carbon atoms.
2. 2-dimethylphosphatoethyl vinyl sulfide.
3. 2-diethylphosphatoethyl vinyl sulfide.
4. 2-diethylphosphatobutyl vinyl sulfide.
5. 2-ethyl(butyl)phosphatoethyl vinyl sulfide.
6. 2-dibutylphosphatocyclohexyl vinyl sulfide.

References Cited in the file of this patent
UNITED STATES PATENTS 2,571,989     Schrader _____ Oct. 16, 1951

FOREIGN PATENTS 1,113,363     France _____ Dec. 5, 1955
947,368     Germany _____ Aug. 16, 1956

OTHER REFERENCES

Kosolapoff: "Organo-Phosphorus Compounds," John Wiley & Sons, New York (1950), page 224.